(12) United States Patent
Suzuki

(10) Patent No.: US 11,196,033 B2
(45) Date of Patent: Dec. 7, 2021

(54) METHOD FOR MANUFACTURING ELECTRODE BY SWITCHING CONTACT REGION OF ROLL SURFACE UPON ABNORMALITY DETECTION

(71) Applicant: TOYOTA JIDOSHA KABUSHIKI KAISHA, Toyota (JP)

(72) Inventor: Shigeru Suzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/240,399

(22) Filed: Apr. 26, 2021

(65) Prior Publication Data

US 2021/0249643 A1 Aug. 12, 2021

Related U.S. Application Data

(62) Division of application No. 16/047,350, filed on Jul. 27, 2018, now Pat. No. 11,031,582.

(30) Foreign Application Priority Data

Sep. 1, 2017 (JP) .............................. JP2017-168534

(51) Int. Cl.
*H01M 4/04* (2006.01)
*G01N 21/89* (2006.01)
*G01N 21/88* (2006.01)
*G01N 21/84* (2006.01)

(52) U.S. Cl.
CPC ...... *H01M 4/0435* (2013.01); *G01N 21/8914* (2013.01); *G01N 2021/8416* (2013.01); *G01N 2021/8841* (2013.01); *G01N 2021/8918* (2013.01); *H01M 4/0404* (2013.01); *H01M 4/0471* (2013.01)

(58) Field of Classification Search
CPC ... G01N 2021/8416; G01N 2021/8841; G01N 2021/8918; G01N 21/8914; H01M 4/0404; H01M 4/0435
See application file for complete search history.

(56) References Cited

U.S. PATENT DOCUMENTS 9,490,472 B2 11/2016 Nanba et al.
10,276,855 B2 4/2019 Uchida et al.
10,347,905 B2 7/2019 Nanba et al.
(Continued)

FOREIGN PATENT DOCUMENTS

JP 2014072114 A 4/2014
JP 2016018647 A 2/2016

*Primary Examiner* — Minh N Trinh
(74) *Attorney, Agent, or Firm* — Sughrue Mion, PLLC

(57) ABSTRACT

An apparatus for manufacturing an electrode performs press-working of a strip electrode being conveyed. This manufacturing apparatus includes a press roll including a roll surface having a width that is twice or more a width of the strip electrode, a switch configured to switch a contact region of the roll surface contacting with the strip electrode during press-working, and a controller. When an abnormality of the roll surface is detected in a state where the contact region of the roll surface is a region located on the left side with respect to a center line of the roll surface, the controller controls the switch such that the contact region of the roll surface is switched to a region located on the right side with respect to the center line of the roll surface.

1 Claim, 6 Drawing Sheets

(56) References Cited

U.S. PATENT DOCUMENTS

| | | | |
|---|---|---|---|
| 11,031,582 B2 * | 6/2021 | Suzuki | ............... G01N 21/8914 |
| 2019/0074503 A1 | 3/2019 | Suzuki | |
| 2020/0243835 A1 * | 7/2020 | Oikawa | ............. H01M 10/0525 |

* cited by examiner

METHOD FOR MANUFACTURING ELECTRODE BY SWITCHING CONTACT REGION OF ROLL SURFACE UPON ABNORMALITY DETECTION

INCORPORATION BY REFERENCE

This is a divisional of U.S. application Ser. No. 16/047,350 filed on Jul. 27, 2018, which claims priority to Japanese Patent Application No. 2017-168534 filed on Sep. 1, 2017, the disclosure of which, including the specification, drawings and abstract are incorporated herein by reference in its entirety.

BACKGROUND

Field

The present disclosure relates to the technique for manufacturing an electrode used in a battery and the like.

Description of the Background Art

Generally, an electrode used in a battery and the like is manufactured by dividing a strip electrode. The strip electrode is manufactured by applying an electrode paste onto a strip-like metal foil as an active material layer and performing press-working of the strip-like metal foil using a press roll. Such press-working causes an increase in density of the active material layer applied onto the surface of the strip electrode (refer to Japanese Patent Laying-Open No. 2016-18647 and the like).

SUMMARY

A roll surface (contact surface with an electrode to be pressed) of a press roll may be often broken due to local increase in thickness of the electrode before press-working or biting of a foreign substance other than the electrode. When the roll surface is broken, the electrode of good quality cannot be manufactured, and thus, it is desirable to replace the press roll. However, in order to replace the press roll, it is necessary to stop press production of the electrode, and thus, continuous production of the electrode becomes difficult.

The present disclosure has been made in order to solve the above-described problem and an object of the present disclosure is to allow continuous production of an electrode of good quality even when an abnormality (such as breakage) of a roll surface of a press roll is detected.

(1) An apparatus for manufacturing an electrode according to the present disclosure includes: a press roll configured to perform press-working of a strip electrode being conveyed, and including a roll surface having a width greater than a width of the electrode; a switch configured to switch a contact region of the roll surface by switching a conveyance path of the electrode, the contact region contacting with the electrode during press-working; a detector configured to detect a state of the roll surface; and a controller configured to control the switch. When an abnormality of the roll surface is detected in a state where the contact region is a first region, the controller switches the contact region from the first region to a second region using the switch. The second region does not include an abnormal portion of the roll surface.

According to the above-described configuration, when the abnormality of the roll surface is detected, the contact region of the roll surface is switched from the first region at the time of detection of the abnormality to the second region that does not include the abnormal portion, by switching the conveyance path of the electrode. Thus, it is possible to continuously manufacture the electrode while avoiding the abnormal portion of the roll surface. As a result, it is possible to continuously produce the electrode of good quality even when the abnormality of the roll surface of the press roll is detected.

(2) In an embodiment, the width of the roll surface is set to be twice or more the width of the electrode. The second region does not overlap with the first region.

According to the above-described configuration, when the abnormality of the roll surface is detected, the contact region of the roll surface is switched from the first region at the time of detection of the abnormality to the second region that does not overlap with the first region. Thus, it is possible to continuously produce the electrode of good quality without specifying the position of the abnormal portion of the roll surface.

(3) In an embodiment, when the abnormality of the roll surface is detected, the controller specifies the abnormal portion of the roll surface using a result of detection by the detector. The second region does not include the specified abnormal portion and overlaps with a part of the first region.

According to the above-described configuration, when the abnormality of the roll surface is detected, the abnormal portion of the roll surface is specified. The contact region of the roll surface is switched from the first region at the time of detection of the abnormality to the second region that does not include the specified abnormal portion and overlaps with a part of the first region. Thus, as compared with the case of simply switching the contact region to the region that does not overlap with the first region, the width of the roll surface required to switch the contact region can be reduced. Therefore, the width of the roll surface can, for example, be set to be less than twice the width of the electrode to thereby achieve reduction in size of the roll, and the number of times of switching of the contact region can be increased.

(4) A method for manufacturing an electrode according to the present disclosure is a method for manufacturing an electrode using a manufacturing apparatus. The manufacturing apparatus includes: a press roll configured to perform press-working of the electrode being conveyed, and including a roll surface having a width greater than a width of the electrode; a switch configured to switch a contact region of the roll surface by switching a conveyance path of the electrode, the contact region contacting with the electrode during press-working; and a detector configured to detect a state of the roll surface. The method includes: determining whether or not the abnormality of the roll surface has been detected in a state where the contact region is a first region; and when the abnormality of the roll surface is detected in the state where the contact region is the first region, switching the contact region from the first region to a second region using the switch. The second region does not include an abnormal portion of the roll surface.

According to the above-described method, when the abnormality of the roll surface is detected, the contact region of the roll surface is switched from the first region at the time of detection of the abnormality to the second region that does not include the abnormal portion, by switching the conveyance path of the electrode. Thus, it is possible to continuously manufacture the electrode while avoiding the abnormal portion of the roll surface. As a result, it is possible to continuously produce the electrode of good quality even when the abnormality of the roll surface of the press roll is detected.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
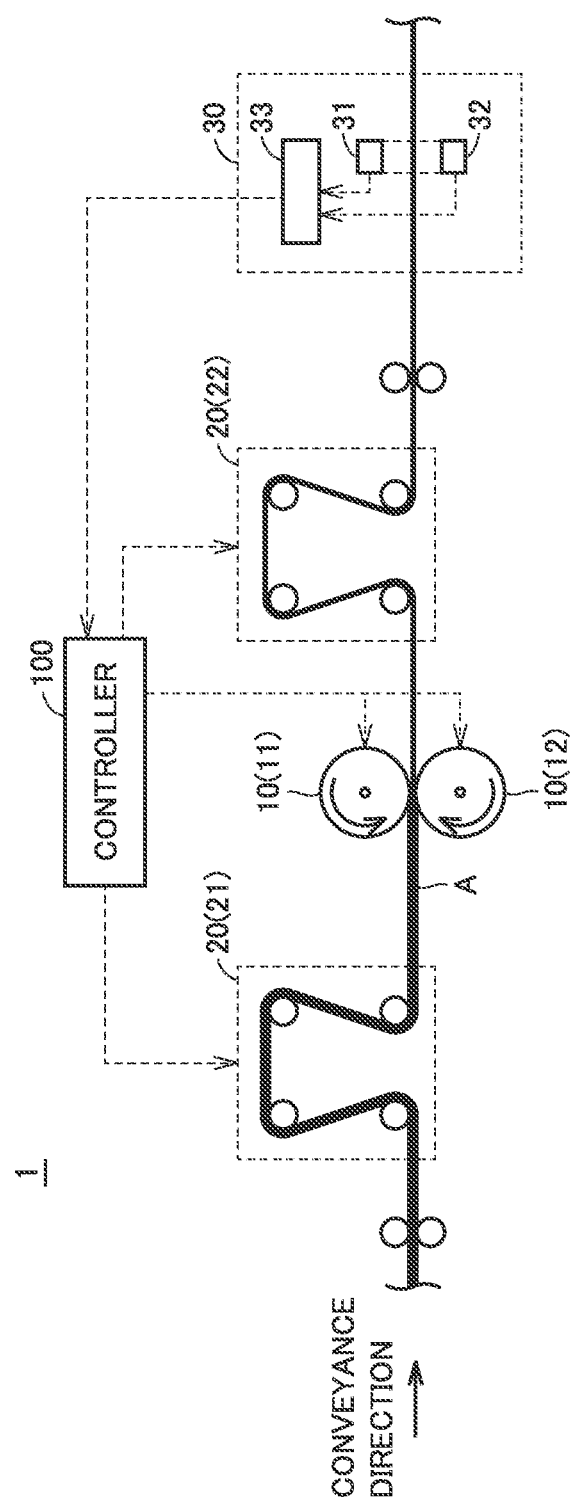
FIG. 1 shows one example of an overall configuration of a manufacturing apparatus for manufacturing an electrode.

An embodiment of the present disclosure will be described in detail hereinafter with reference to the drawings, in which the same or corresponding portions are denoted by the same reference characters and description thereof will not be repeated.

<Overall Configuration>

FIG. 1 shows one example of an overall configuration of a manufacturing apparatus 1 for manufacturing an electrode according to the present embodiment. Manufacturing apparatus 1 is used in the pressing step which is one step for manufacturing an electrode of a battery. The manufactured electrode is used in a secondary battery (e.g., a lithium ion secondary battery). The manufactured electrode may also be used in a primary battery.

The steps prior to the pressing step include the applying step and the drying step. In the applying step, electrode pastes are applied onto both front and rear surfaces of a strip-like metal foil, respectively, at a prescribed setting width by continuous application. The electrode paste is like slurry and includes an active material. The active material may be either a positive electrode active material or a negative electrode active material.

In the drying step, the electrode pastes applied onto both the front and rear surfaces of the strip-like metal foil are dried. As a result, a strip electrode A having the active material layers formed on both the front and rear surfaces of the strip-like metal foil, respectively, is obtained.

In the pressing step, strip electrode A is placed in an unwinding roll in a wound state, and when a winding roll is actuated, strip electrode A is unwound from the unwinding roll and conveyed between the unwinding roll and the winding roll under a prescribed tension at a prescribed conveyance speed. When this conveyance of strip electrode A is started, manufacturing apparatus 1 is operated.

Manufacturing apparatus 1 includes a press roll 10, a switch 20, a detector 30, and a controller 100. Strip electrode A is conveyed in a direction from the upstream side (left side in FIG. 1) where the unwinding roll is provided toward the downstream side (right side in FIG. 1) where the winding roll is provided.

Press roll 10 is configured to perform press-working of strip electrode A being conveyed, in order to increase the density of the active material layers formed on both the front and rear surfaces of strip electrode A, respectively. Press roll 10 includes a pair of press rolls 11 and 12 each having a roll surface (contact surface with strip electrode A to be pressed). Strip electrode A is sandwiched between the roll surface of press roll 11 and the roll surface of press roll 12, and press roll 10 thereby performs press-working of both the front and rear surfaces of strip electrode A.

Switch 20 is configured to be capable of switching a conveyance path of strip electrode A. Switch 20 includes a roller mechanism 21 provided on the conveyance path between the unwinding roll and press roll 10 (i.e., on the upstream side with respect to press roll 10), and a roller mechanism 22 provided on the conveyance path between press roll 10 and the winding roll (i.e., on the downstream side with respect to press roll 10).

Figure 2:
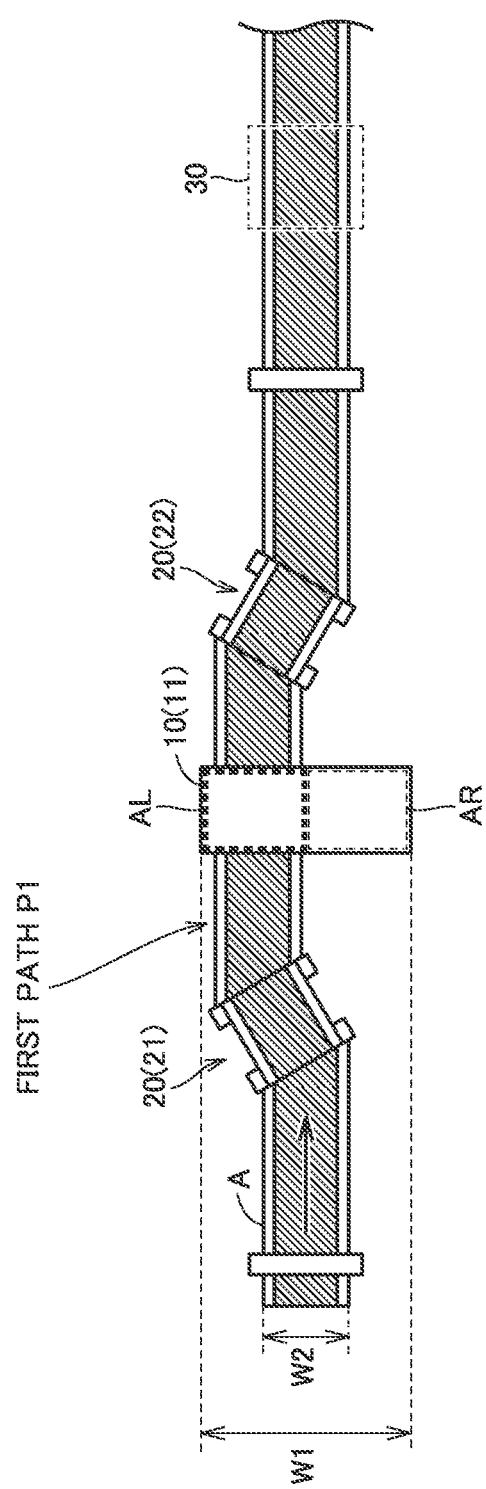
FIG. 2 schematically shows a state in which a conveyance path of a strip electrode is set at a first path P1.
Figure 3:
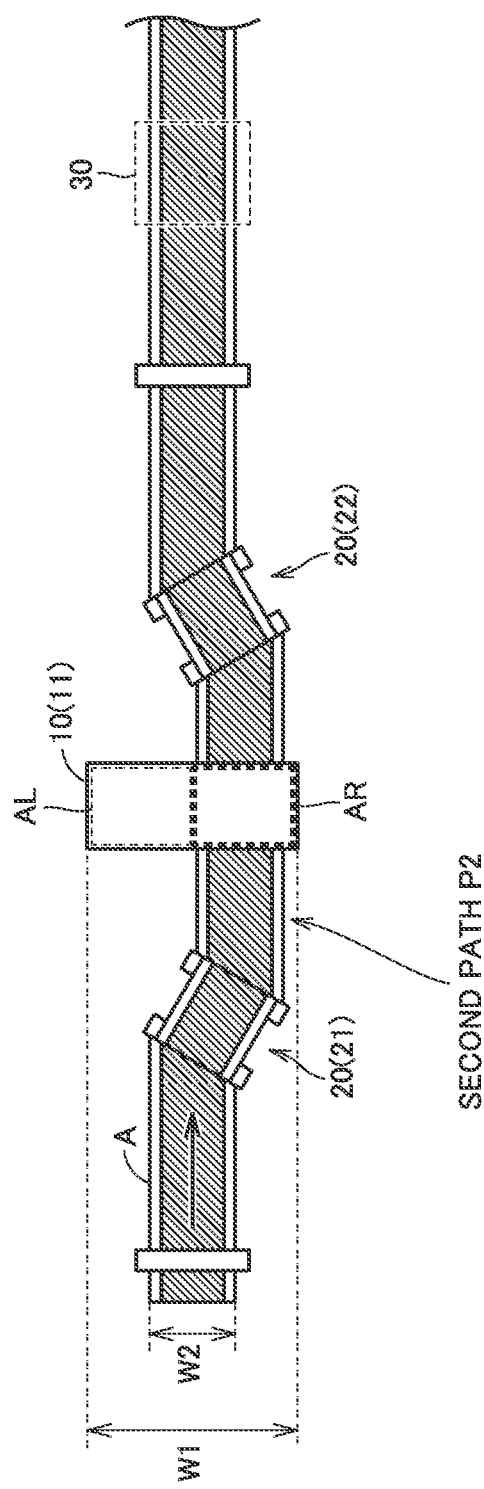
FIG. 3 schematically shows a state in which the conveyance path of the strip electrode is set at a second path P2.

As shown in FIGS. 2 and 3 described below, switch 20 can switch the conveyance path of strip electrode A between roller mechanism 21 and roller mechanism 22 by cooperatively controlling a positional relation between roller mechanism 21 on the upstream side and roller mechanism 22 on the downstream side.

Detector 30 is provided on the conveyance path between roller mechanism 22 and the winding roll (i.e., on the downstream side with respect to press roll 10), and detects a state of strip electrode A having passed through press roll 10. For example, detector 30 includes a pair of cameras 31 and 32 that take pictures of both the front and rear surfaces of strip electrode A, and an image recognition system 33 that recognizes the state of strip electrode A based on the data taken by cameras 31 and 32. Detector 30 outputs a result of detection to controller 100. Although the example in which image recognition system 33 is included in detector 30 is described in the present embodiment, the function of image recognition system 33 may be included in controller 100.

A not-shown CPU (Central Processing Unit) and a not-shown memory are built into controller 100. Controller 100 controls press roll 10, switch 20 and the like based on the information provided from detector 30 and the like.

<Conveyance Path of Strip Electrode>

In the present embodiment, it is assumed that controller 100 cooperatively controls the positional relation between roller mechanisms 21 and 22 included in switch 20, and the conveyance path of strip electrode A between roller mechanism 21 and roller mechanism 22 is thereby set at either a first path P1 and a second path P2.

FIG. 2 schematically shows a state in which the conveyance path of strip electrode A is set at first path P1. FIG. 2 shows a state of manufacturing apparatus 1 as viewed from the upper side (press roll 11 side) in FIG. 1.

In the present embodiment, as shown in FIG. 2, a width W1 of the roll surface of press roll 10 is set to be twice or more a width W2 of strip electrode A.

In the state where the conveyance path is set at first path P1, the positional relation between roller mechanisms 21 and 22 is controlled such that a contact region of the roll surface of press roll 10 contacting with strip electrode A during press-working (hereinafter, also simply referred to as "a contact region of the roll surface") is a region AL located on the left side with respect to a center line of the roll surface as viewed from the conveyance direction, as shown in FIG. 2. Therefore, when the conveyance path is first path P1, press-working of strip electrode A is performed in region AL located on the left side with respect to the center line of the roll surface.

FIG. 3 schematically shows a state in which the conveyance path of strip electrode A is set at second path P2. Similarly to FIG. 2, FIG. 3 also shows a state of manufacturing apparatus 1 as viewed from the upper side (press roll 11 side) in FIG. 1.

In the state where the conveyance path is set at second path P2, the positional relation between roller mechanisms 21 and 22 is controlled such that the contact region of the roll surface of press roll 10 is a region AR located on the right side with respect to the center line of the roll surface as viewed from the conveyance direction, as shown in FIG. 3. Therefore, when the conveyance path is second path P2, press-working of strip electrode A is performed in region AR located on the right side with respect to the center line of the roll surface (region that does not overlap with left region AL).

<Detection of Abnormality of Roll Surface>

An abnormality such as breakage may often occur on the roll surface of press roll 10 due to local increase in thickness of strip electrode A before press-working or biting of a foreign substance other than strip electrode A. When an abnormality (such as breakage) occurs on the roll surface, it is assumed that the electrode of good quality can no longer be manufactured.

Therefore, controller 100 analyzes the state of strip electrode A detected by detector 30, and detects an abnormality (such as breakage) on the roll surface of press roll 10. For example, when a defect such as a flaw occurs on the surface of strip electrode A and the defect regularly occurs in a cycle corresponding to a roll diameter of press roll 10 as a result of analysis of the state of strip electrode A based on the result of detection by detector 30, controller 100 determines that the roll surface of press roll 10 is in an abnormal state.

<Switching of Conveyance Path when Abnormality of Roll Surface is Detected>

As described above, when an abnormality such as breakage occurs on the roll surface of press roll 10, strip electrode A of good quality cannot be manufactured. Therefore, when an abnormality of the roll surface is detected, it is desirable to replace or repair press roll 10.

However, in order to replace or repair press roll 10, it is necessary to stop manufacturing apparatus 1 and stop press production of strip electrode A. Therefore, continuous production of strip electrode A becomes difficult.

In view of this point, at the start of press production, controller 100 according to the present embodiment sets the conveyance path of strip electrode A at "first path P1" (state in which the contact region is region AL located on the left side with respect to the center line of the roll surface) shown in FIG. 2 described above.

When an abnormality of the roll surface is detected, it is assumed that the abnormal portion is in left region AL of the roll surface, and thus, controller 100 switches the conveyance path of strip electrode A from first path P1 to second path P2 shown in FIG. 3 described above. As a result, the contact region of the roll surface is switched to right region AR (region that does not overlap with left region AL) of the roll surface. Therefore, it is possible to continuously manufacture strip electrode A while avoiding the abnormal portion of the roll surface, without replacing press roll 10.

Figure 4:
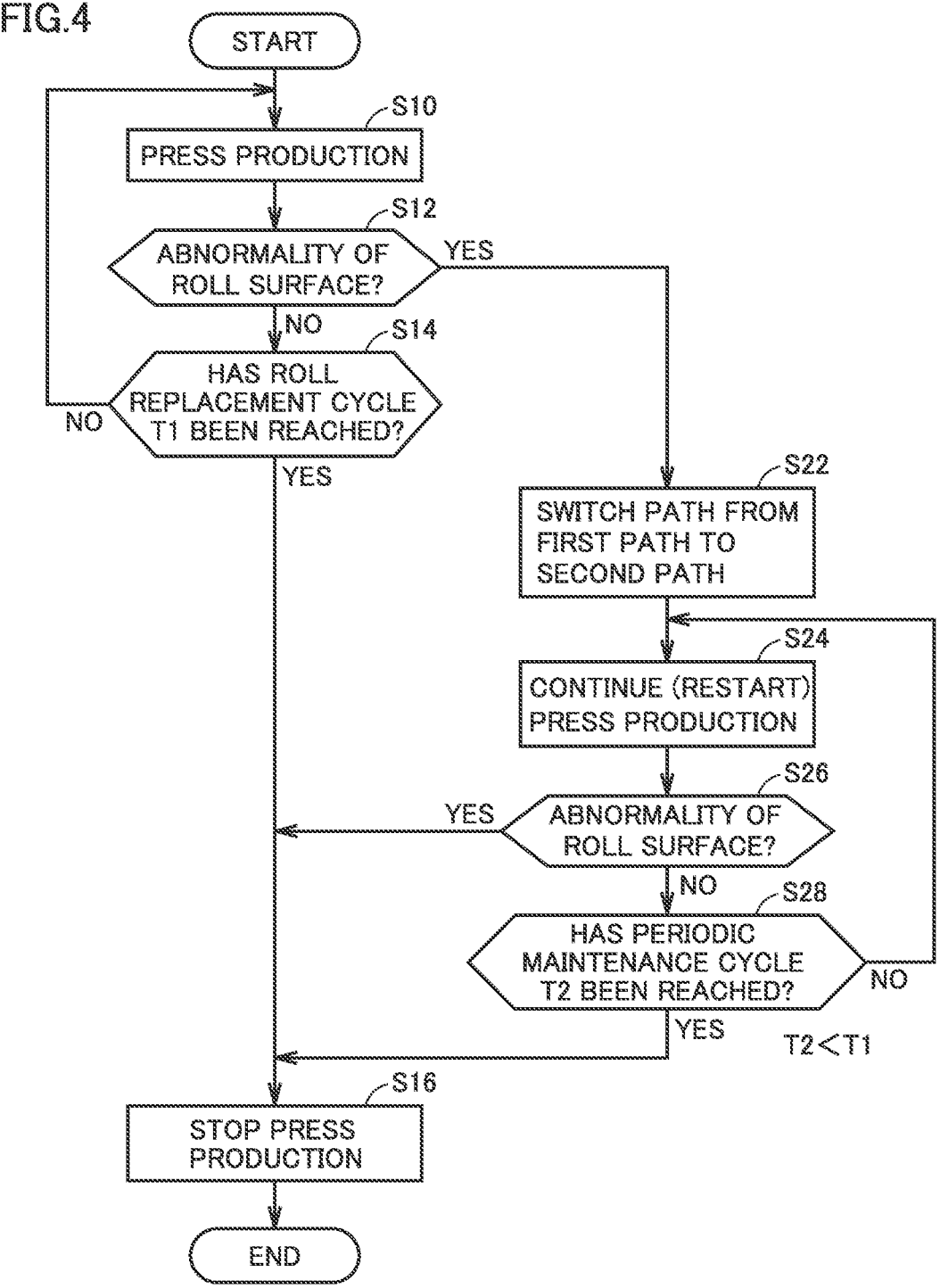
FIG. 4 is a flowchart showing one example of a process procedure by a controller.

FIG. 4 is a flowchart showing one example of a process procedure executed by controller 100 during press production of strip electrode A. This flowchart is started in the state where the conveyance path of strip electrode A is set at first path P1.

In step S10, controller 100 conveys strip electrode A and performs press production (press-working by press roll 10) of strip electrode A.

Next, controller 100 analyzes the state of strip electrode A detected by detector 30, and determines whether or not an abnormality of the roll surface of press roll 10 has been detected (step S12).

When the abnormality of the roll surface has not been detected (NO in step S12), controller 100 performs a periodic replacement process for performing periodic replacement of press roll 10. Specifically, controller 100 first determines whether or not the time elapsed from the previous replacement of press roll 10 has reached a predetermined roll replacement cycle T1 (step S14). Roll replacement cycle T1 is set at a relatively long time period (e.g., several years). When roll replacement cycle T1 has not been reached (NO in step S14), controller 100 returns the process to step S10 and continues press production. When roll replacement cycle T1 has been reached (YES in step S14), controller 100 stops press production in order to perform periodic replacement of press roll 10 (step S16).

On the other hand, when the abnormality of the roll surface has been detected (YES in step S12), it is assumed that the abnormal portion is in left region AL of the roll surface, and thus, controller 100 temporarily stops press production and switches the conveyance path of strip electrode A from first path P1 to second path P2 (step S22). As a result, the contact region of the roll surface is switched to right region AR (region that does not overlap with left region AL) of the roll surface.

After the conveyance path is switched to second path P2, controller 100 restarts press production and continues press production without replacing press roll 10 (step S24). As a result, during the time period until the next periodic maintenance time comes, strip electrode A can be manufactured in a planned manner without significantly stopping press production.

After press production is restarted, controller 100 determines whether or not an abnormality of the roll surface of press roll 10 has been detected (step S26).

When the abnormality of the roll surface has been detected after the restart of press production (YES in step S26), it is assumed that the abnormal portions are not only in left region AL but also in right region AR of the roll surface, and thus, controller 100 stops press production in order to replace press roll 10 (step S16).

When the abnormality of the roll surface has not been detected after the restart of press production (NO in step S26), controller 100 determines whether or not the time elapsed from the previous periodic maintenance of manufacturing apparatus 1 has reached a periodic maintenance cycle T2 (step S28). Periodic maintenance cycle T2 is set at a time period (e.g., several months) shorter than roll replacement cycle T1 described above.

When periodic maintenance cycle T2 has not been reached (NO in step S28), controller 100 returns the process to step S24 and continues press production.

When periodic maintenance cycle T2 has been reached (YES in step S28), controller 100 stops press production in order to replace press roll 10 (step S16). That is, in view of the fact that the abnormal portion is in left region AL of the roll surface after the restart of press production, controller 100 replaces press roll 10 when periodic maintenance cycle T2 (e.g., several months) has been reached, even if roll replacement cycle T1 (e.g., several years) has not been reached.

As described above, when an abnormality of the roll surface is detected in the initial state, it is assumed that the abnormal portion is in region AL located on the left side with respect to the center line of the roll surface, and thus, controller 100 according to the present embodiment controls switch 20 to thereby switch the conveyance path of strip electrode A from first path P1 (see FIG. 2) to second path P2 (see FIG. 3). As a result, the contact region of the roll surface is switched to region AR that does not overlap with region AL. Therefore, it is possible to continuously manufacture strip electrode A while avoiding the abnormal portion of the roll surface, without replacing press roll 10.

Particularly, in the present embodiment, width W1 of the roll surface is set to be twice or more width W2 of the electrode. When an abnormality of the roll surface is detected, the contact region of the roll surface is switched from region AL at the time of detection of the abnormality to region AR that does not overlap with region AL at the time of detection of the abnormality. As a result, it is possible to switch the conveyance path without specifying the position of the abnormal portion of the roll surface, and continuously produce the electrode of good quality.

<First Modification>

In the embodiment described above, when an abnormality of the roll surface is detected, the conveyance path of strip electrode A is switched and the contact region of the roll surface is thereby switched from region AL at the time of detection of the abnormality to region AR that does not overlap with region AL. However, a method for switching the conveyance path (method for switching the contact region) is not limited to such a method.

For example, when an abnormality of the roll surface is detected, controller 100 may specify a position of an abnormal portion H of the roll surface using the result of detection by detector 30 and switch the conveyance path such that abnormal portion H goes out of the contact region of the roll surface.

Figure 5:
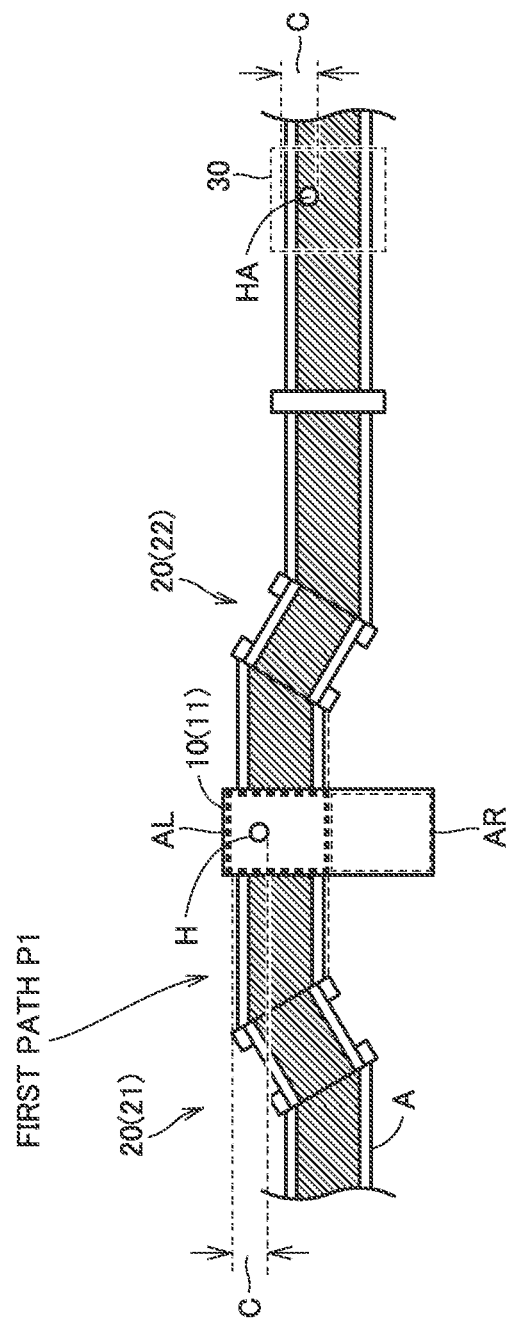
FIG. 5 schematically shows a state in which an abnormality of a roll surface is detected, with the conveyance path of strip electrode A set at first path P1.

FIG. 5 schematically shows a state in which an abnormality of the roll surface has been detected in the state where the conveyance path of strip electrode A is set at first path P1 (in the state where the contact region of the roll surface is region AL). In the example shown in FIG. 5, an abnormal portion HA occurs at a position of a distance C from the left end of strip electrode A. In this case, controller 100 specifies that abnormal portion H is at the position corresponding to distance C from the left end of the roll surface.

Then, controller 100 switches the conveyance path such that the contact region of the roll surface is switched to a region that does not include specified abnormal portion H and overlaps with a part of region AL at the time of detection of the abnormality.

Figure 6:
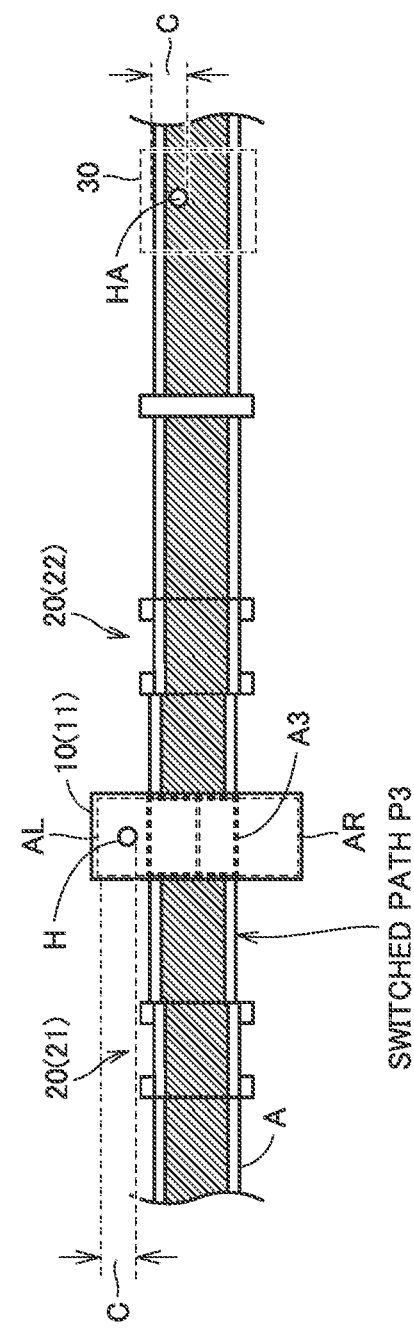
FIG. 6 schematically shows one example of a switched conveyance path P3 when an abnormal portion H of the roll surface is specified.

FIG. 6 schematically shows one example of a switched conveyance path P3 when abnormal portion H shown in FIG. 5 is specified. As shown in FIG. 6, switched conveyance path P3 is a path obtained by sliding non-switched first path P1 to the right side in the conveyance direction by distance C along the rotation axis direction of press roll 10.

As a result, in switched conveyance path P3, the contact region of the roll surface is a region A3 that does not include specified abnormal portion H and overlaps with a part of region AL. Therefore, as compared with the case of simply switching the contact region to region AR that does not overlap with region AL, the width of the roll surface required to switch the contact region can be reduced. Therefore, width W1 of the roll surface can, for example, be set to be less than twice width W2 of the electrode to thereby achieve reduction in size of press roll 10. In addition, the number of times of switching of the contact region can be increased and a grace period up to replacement of the roll can be lengthened.

<Second Modification>

Although the example in which detector 30 detects the state of strip electrode A using the cameras has been described in the foregoing embodiment, detector 30 may detect the state of strip electrode A using a sensor (such as, for example, a sensor that detects irregularities by measuring a distance to an object).

<Third Modification>

Although the example of detecting the state of the roll surface based on the result of detection of the state of strip electrode A has been described in the foregoing embodiment, the state of the roll surface may be directly detected using a camera, the above-described sensor or the like.

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A method for switching contact region during manufacturing an electrode operatively associated with a manufacturing apparatus, comprising steps of:
   using the manufacturing apparatus comprising:
   a press roll configured to perform press-working of the electrode being conveyed, and including a roll surface having a width greater than a width of the electrode;
   a switch configured to switch the contact region of the roll surface by switching a conveyance path of the electrode, the contact region contacting with the electrode during press-working; and
   a detector configured to detect a state of the roll surface, wherein the contact region includes a first region and a second region;
   wherein the using the manufacturing apparatus further comprising:
   determining whether or not the abnormality of the roll surface has been detected in a state of the electrode where the contact region is the first region; and
   when the abnormality of the roll surface is detected in the state of the electrode where the contact region is the first region, switching the contact region from the first region to the second region using the switch,
   the second region not including an abnormal portion of the roll surface.

* * * * *